US008645652B2

(12) United States Patent
Batchelor et al.

(10) Patent No.: US 8,645,652 B2
(45) Date of Patent: Feb. 4, 2014

(54) CONCURRENTLY MOVING STORAGE DEVICES FROM ONE ADAPTER PAIR TO ANOTHER

(75) Inventors: Gary W. Batchelor, Tucson, AZ (US); Brian J. Cagno, Tucson, AZ (US); John C. Elliott, Tucson, AZ (US); Enrique Q. Garcia, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 12/971,763

(22) Filed: Dec. 17, 2010

(65) Prior Publication Data

US 2012/0159069 A1 Jun. 21, 2012

(51) Int. Cl.
| | |
|---|---|
| G06F 12/00 | (2006.01) |
| G06F 13/00 | (2006.01) |
| G06F 13/28 | (2006.01) |
| G06F 3/00 | (2006.01) |
| G06F 15/16 | (2006.01) |
| G06F 15/173 | (2006.01) |

(52) U.S. Cl.
USPC ........... 711/165; 711/114; 711/149; 711/154; 711/162; 710/38; 709/218; 709/238

(58) Field of Classification Search
USPC ................. 711/114, 149, 154, 161–162, 165; 709/218, 238–239; 710/38
See application file for complete search history.

(56) References Cited

U.S. PATENT DOCUMENTS

| | | | |
|---|---|---|---|
| 7,516,352 B2 | 4/2009 | Elliott et al. | |
| 2003/0208618 A1* | 11/2003 | Mor et al. | ...................... 709/238 |
| 2005/0044312 A1 | 2/2005 | Blumenau et al. | |
| 2005/0172097 A1 | 8/2005 | Voigt et al. | |
| 2005/0228943 A1* | 10/2005 | DeCenzo et al. | .............. 711/114 |
| 2006/0236006 A1 | 10/2006 | Okada et al. | |
| 2008/0059745 A1* | 3/2008 | Tsukada et al. | ................ 711/165 |
| 2009/0198862 A1* | 8/2009 | Okitsu et al. | .................. 710/316 |
| 2010/0030983 A1* | 2/2010 | Gupta et al. | .................. 711/162 |
| 2012/0066427 A1* | 3/2012 | Johnson et al. | ............... 710/306 |

FOREIGN PATENT DOCUMENTS

| | | |
|---|---|---|
| EP | 1 357 476 A2 | 10/2003 |
| EP | 1 857 918 A2 | 11/2007 |
| EP | 2 163 978 A2 | 3/2010 |
| JP | 2008040842 A | 2/2008 |
| WO | WO9815895 A1 | 4/1998 |

OTHER PUBLICATIONS

Amiri, Khalil, "Scalable and Manageable Storage Systems", CMU-CS-00-178, Department of Electrical and Computer Engineering, Carnegie Mellon University, Pittsburgh, PA 15213, 2000, 261 pages. (Part 1—pp. 1-87).

(Continued)

*Primary Examiner* — Ryan Bertram
(74) *Attorney, Agent, or Firm* — Stephen R. Tkacs; Stephen J. Walder, Jr.; Randall J. Bluestone

(57) ABSTRACT

A mechanism is provided for moving control of storage devices from one adapter pair to another. In a trunked disk array configuration, moving the storage devices from one disk array to another disk array begins by attaching the downstream ports of the two independent disk arrays together. The mechanism redefines one set of the ports as upstream ports and through switch zoning makes a set of devices available to the second disk array adapters. By controlling zoning access and performing discovery one device port at a time, the mechanism transfers access and ownership of the RAID group from one adapter pair to another.

19 Claims, 6 Drawing Sheets

(56) References Cited

OTHER PUBLICATIONS

Amiri, Khalil, "Scalable and Manageable Storage Systems", CMU-CS-00-178, Department of Electrical and Computer Engineering, Carnegie Mellon University, Pittsburgh, PA 15213, 2000, 261 pages. (Part 2—pp. 88-174).

Amiri, Khalil, "Scalable and Manageable Storage Systems", CMU-CS-00-178, Department of Electrical and Computer Engineering, Carnegie Mellon University, Pittsburgh, PA 15213, 2000, 261 pages. (Part 3—pp. 175-261).

PCT Search Report and Written Opinion, International Application No. PCT/EP2011/072713 dated Apr. 12, 2012, 9 pages.

* cited by examiner

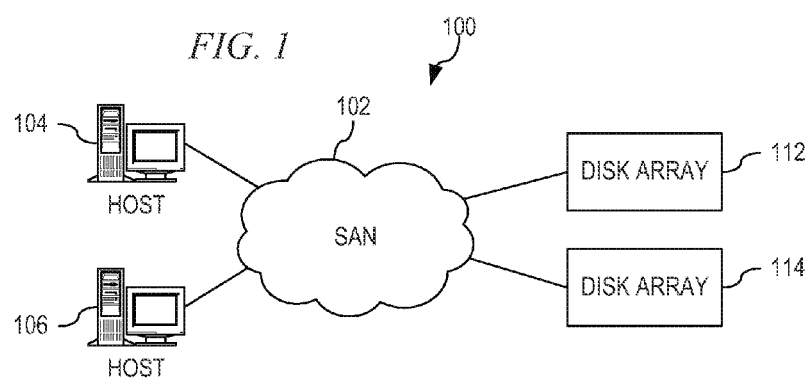
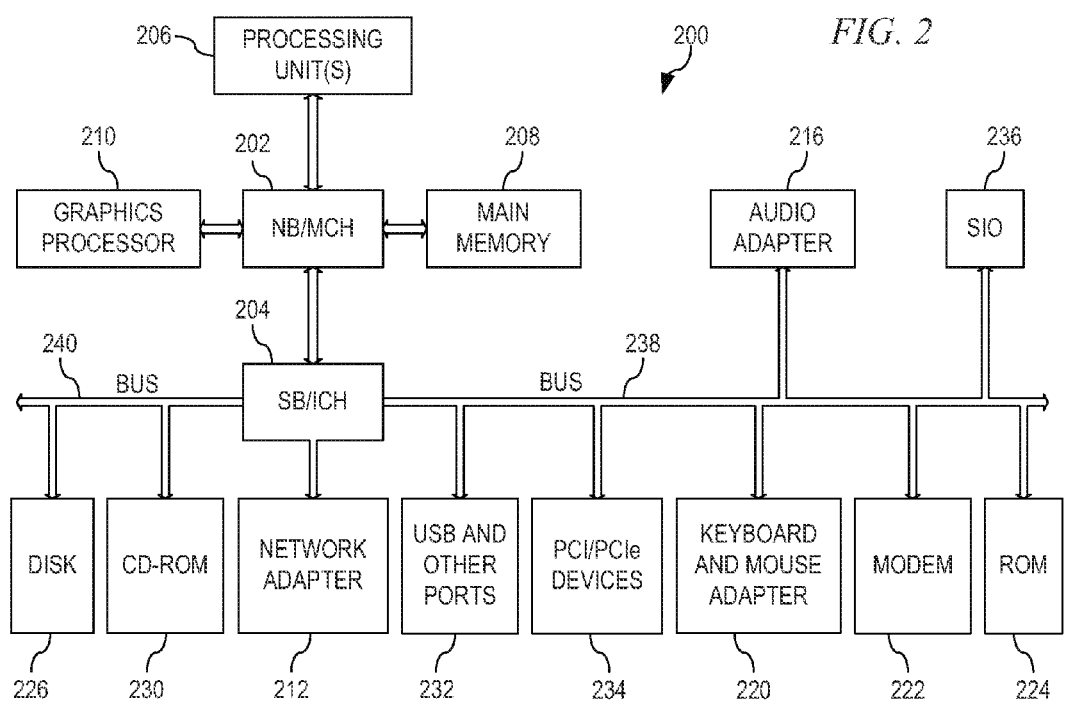

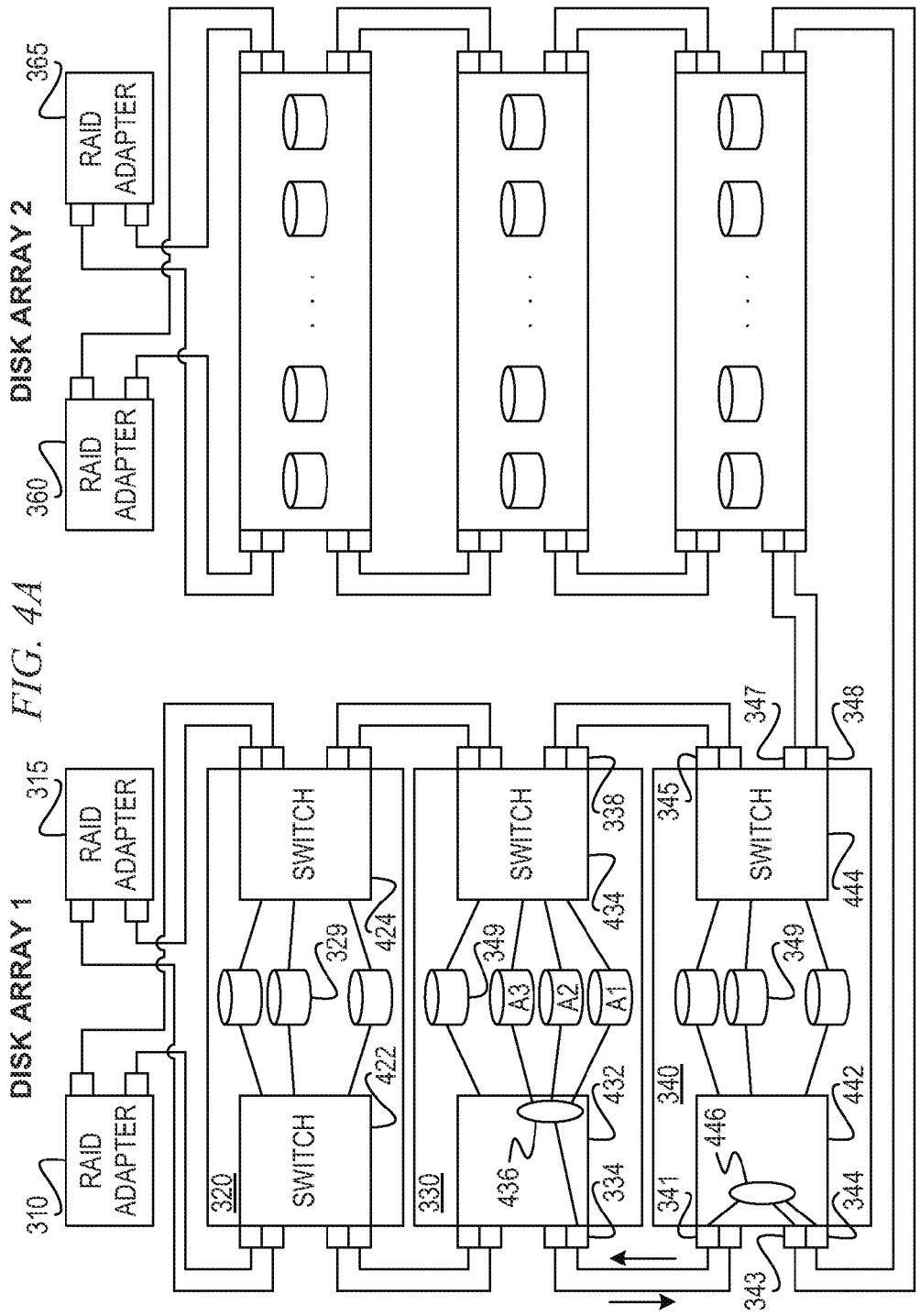

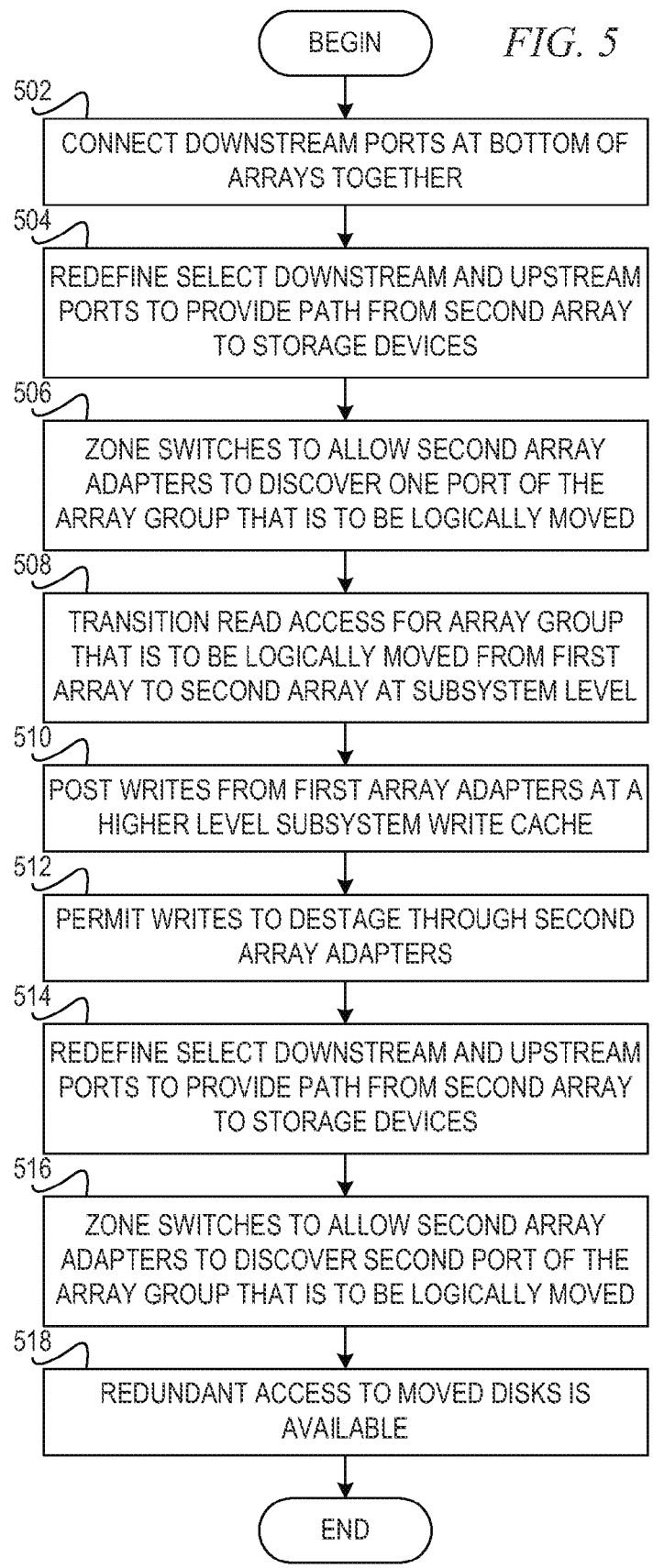

CONCURRENTLY MOVING STORAGE DEVICES FROM ONE ADAPTER PAIR TO ANOTHER

BACKGROUND

The present application relates generally to an improved data processing apparatus and method and more specifically to mechanisms for moving control of storage devices from one adapter pair to another.

A solid-state drive (SSD) is a data storage device that uses solid-state memory to store persistent data. SSDs distinguish from traditional hard disk drives (HDDs), which are electro-mechanical devices containing spinning disks and movable read/write heads. SSDs, in contrast, use microchips that retain data in non-volatile memory chips and contain no moving parts. Compared to traditional HDDs, SSDs are typically less susceptible to physical shock, are quieter, and have lower access time and latency. SSDs use the same interface as hard disk drives, thus easily replacing them in most applications.

SSDs in a traditional disk array present challenges when upgrading a system in order to maximize performance. Because there is such a large disparity in performance capability between mechanical and solid-state devices, a relatively small number of SSDs can fully consume the performance capability of a pair of redundant array of independent disks (RAID) adapters. When upgrading a system to add RAID adapters, HDDs, or SSDs, it is often necessary to move devices from one adapter pair to another. Current art requires that the operation to move devices form one adapter pair to another is non-concurrent. The alternative is to add additional devices and copy the data within the system.

SUMMARY

In one illustrative embodiment, a method, in a data processing system, is provided for logically moving storage devices from one array to another. The method comprises connecting a set of downstream ports of a first array of storage devices to a set of downstream ports of a second array of storage devices. The first array of storage devices has one or more controlling adapters. The second array of storage devices has one or more controlling adapters. The method further comprises providing a path from the one or more controlling adapters of the second array to an array group storage devices in the first array that are to be logically moved to the second array of storage devices. The method further comprises transitioning read and write access for the array group of storage devices from the one or more controlling adapters of the first array to the one or more controlling adapters of the second array.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 depicts a pictorial representation of an example storage area network environment in which aspects of the illustrative embodiments may be implemented;

FIG. 2 is a block diagram of an example data processing system in which aspects of the illustrative embodiments may be implemented;

FIGS. 4A and 4B are block diagrams depicting a configuration for concurrently moving storage devices from one adapter pair to another in accordance with an illustrative embodiment; and FIG. 5 is a flowchart illustrating operation of a mechanism for moving control of storage devices from one adapter pair to another in accordance with an illustrative embodiment.

DETAILED DESCRIPTION

Figure 3A:
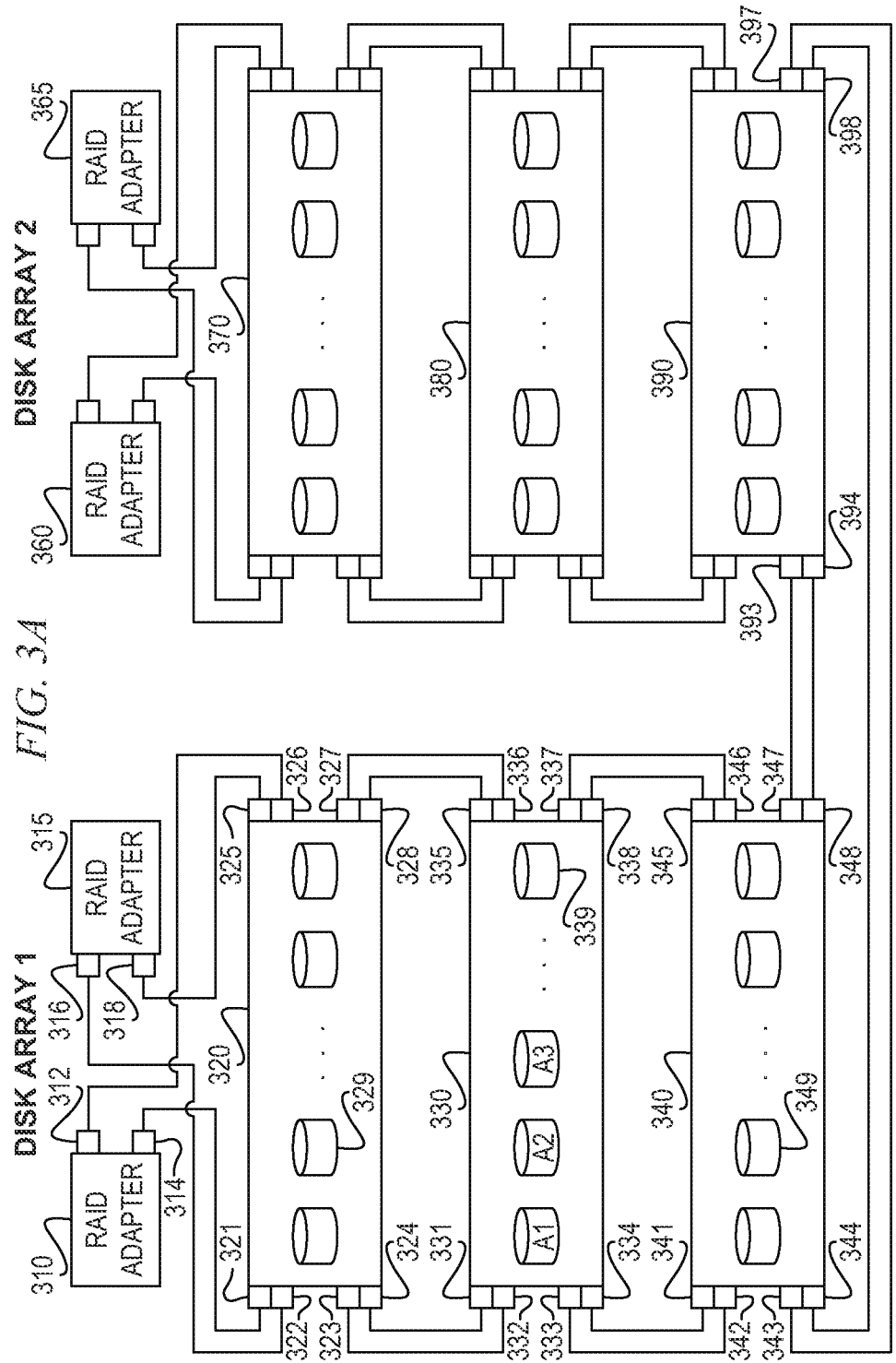
FIGS. 3A and 3B are block diagrams depicting a storage configuration in accordance with an illustrative embodiment.

The illustrative embodiments provide a mechanism for moving control of storage devices from one adapter pair to another. In a trunked disk array configuration, moving the storage devices from one disk array to another disk array begins by attaching the downstream ports of the two independent disk arrays together. The mechanism redefines one sa of the ports as upstream ports and through switch zoning makes a set of devices available to the second disk array adapters. By controlling zoning access and performing discovery one device port at a time, the mechanism transfers access and ownership of the RAID group from one adapter pair to another.

The illustrative embodiments may be utilized in many different types of data processing environments including a storage area network, a blade server system, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a storage area network implementation, this is only an example and is not intended to state or imply any limitation with regard to the features of the present invention. Many modifications to the depicted environments may be made without departing from the spirit and scope of the present invention.

FIG. 1 depicts a pictorial representation of an example storage area network environment in which aspects of the illustrative embodiments may be implemented. Storage area network environment 100 may include a network of computers in which aspects of the illustrative embodiments may be implemented. The storage area network (SAN) environment 100 contains at least one storage area network 102, which is the medium used to provide communication links between various devices and computers connected together within SAN environment 100. The network 102 may include connections, such as wire, wireless communication links, or fiber optic cables.

In the depicted example, server 104 and server 106 are connected to SAN 102. In addition, disk arrays 112 and 114 are also connected to SAN 102. These disk arrays 112 and 114 may be, for example, redundant array of independent disk (RAID) arrays. In the depicted example, servers 104, 106 perform read and write operations to disks in disk arrays 112, 114. SAN environment 100 may include additional servers, storage systems, and other devices not shown.

FIG. 2 is a block diagram of an example data processing system in which aspects of the illustrative embodiments may be implemented. Data processing system 200 is an example of a computer, such as server 104 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, white PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3B:
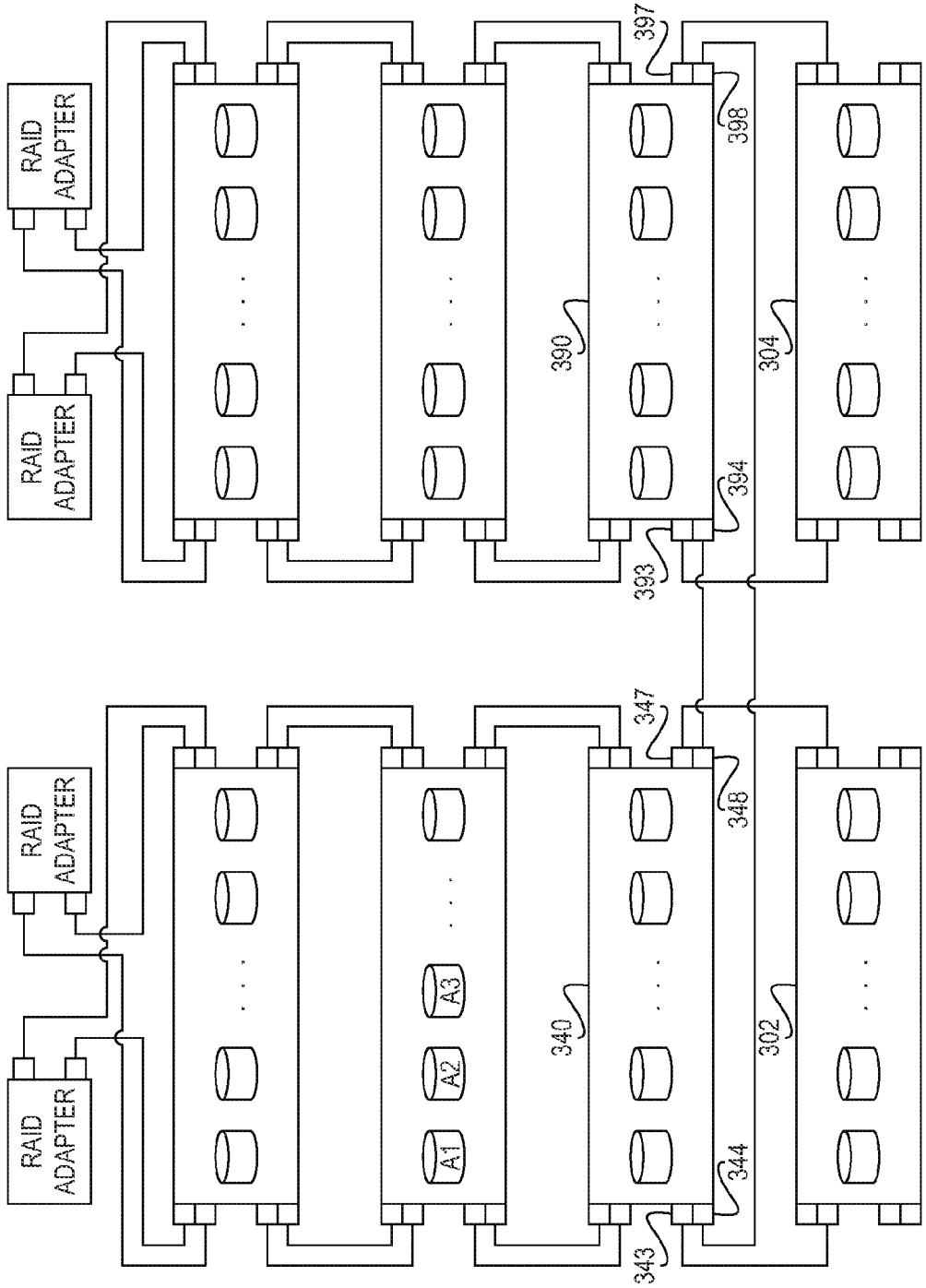

FIGS. 3A and 3B are block diagrams depicting a storage configuration in accordance with an illustrative embodiment. With reference to FIG. 3A, RAID adapters 310, 315, which may also be referred to as controllers, of disk array 1 control storage enclosures 320, 330, 340. RAID adapter 310 has ports 312, 314, and RAID adapter 315 has ports 316, 318. Storage enclosure 320 has ports 321-328 and storage devices 329, which may be hard disk drives (HDDs), solid-state drives (SSDs), other storage devices, or any combination thereof.

Port 312 of RAID adapter 310 connects to port 326 of storage enclosure 320, and port 314 of RAID adapter 310 connects to port 321 of storage enclosure 320. Port 316 of RAID adapter 315 connects to port 322 of storage enclosure 320, and port 318 of RAID adapter 315 connects to port 325 of storage enclosure 320. Ports 312, 314, 316, 318 are downstream ports because they lead away from the controlling RAID adapters 310, 315.

Storage enclosure 330 has ports 331-338 and storage devices 339. Ports 323, 324, 327, 328 of storage enclosure 320 connect to ports 331, 332, 335, 336 of storage enclosure 330. Storage enclosure 340 has ports 341-348 and storage devices 349. Ports 333, 334, 337, 338 of storage enclosure 330 connect to ports 341, 342, 345, 346 of storage enclosure 340. Ports 323, 324, 327, 328 of storage enclosure 320, ports 333, 334, 337, 338 of storage enclosure 330, and ports 343, 344, 347, 348 of storage enclosure 340 are downstream ports, because they lead away from controlling RAID adapters 310, 315. Ports 321, 322, 325, 326 of storage enclosure 320, ports 331, 332, 335, 336 of storage enclosure 330, and ports 341, 342, 345, 346 of storage enclosure 340 are upstream ports, because they lead toward controlling RAID adapters 310, 315.

RAID controllers 360, 365 of disk array 2 connect to storage enclosure 370, which connects to enclosure 380, which connects to enclosure 390. Disk array 1 and disk array 2 represent trunked disk array configurations where multiple paths are used from one connection to another. Disk array 1 and disk array 2 have redundant paths from the controlling adapters to the storage devices. In a normal trunked disk array configuration, ports 343, 344, 347, 348 of storage enclosure 340 in disk array 1 and ports 393, 394, 397, 398 of storage enclosure 390 in disk array 2 are downstream ports that are unused unless storage enclosures are added to the configuration.

In the depicted example, storage devices 339 of storage enclosure 330 in disk array 1 include storage devices A1-A3, which are to be moved from RAID adapters 310, 315 of disk array 1 to RAID adapters 360, 365 in disk array 2. One may wish to move storage devices A1-A3 because they are mismatched in performance capability with the other storage devices in disk array 1, such as SSDs among an array of HDDs, or more generally to balance performance load between the RAID adapter pairs.

In accordance with an illustrative embodiment, one connects ports 343, 344, 347, 348 of storage enclosure 340 to ports 393, 394, 397, 398 of storage enclosure 390. Because these ports are all configured to be downstream ports, these connections are unusable and inactive.

FIG. 3B represents an alternative array configuration in accordance with an example embodiment. Ports 344, 348 of storage enclosure 340 in disk array 1 connect to ports 394, 398 of storage enclosure 390 in disk array 2, as in FIG. 3A. However, ports 343, 347 of storage enclosure 340 may connect to storage enclosure 302, and ports 393, 397 of storage enclosure 390 may connect to storage enclosure 304.

In other words, one disk array may connect to another disk array in the middle of the configuration or storage enclosures may be added to one or both disk arrays and control of storage devices may be moved from one disk array to the other as long as a path can be configured from the RAID adapter pair to the storage devices to be moved.

Figure 4B:
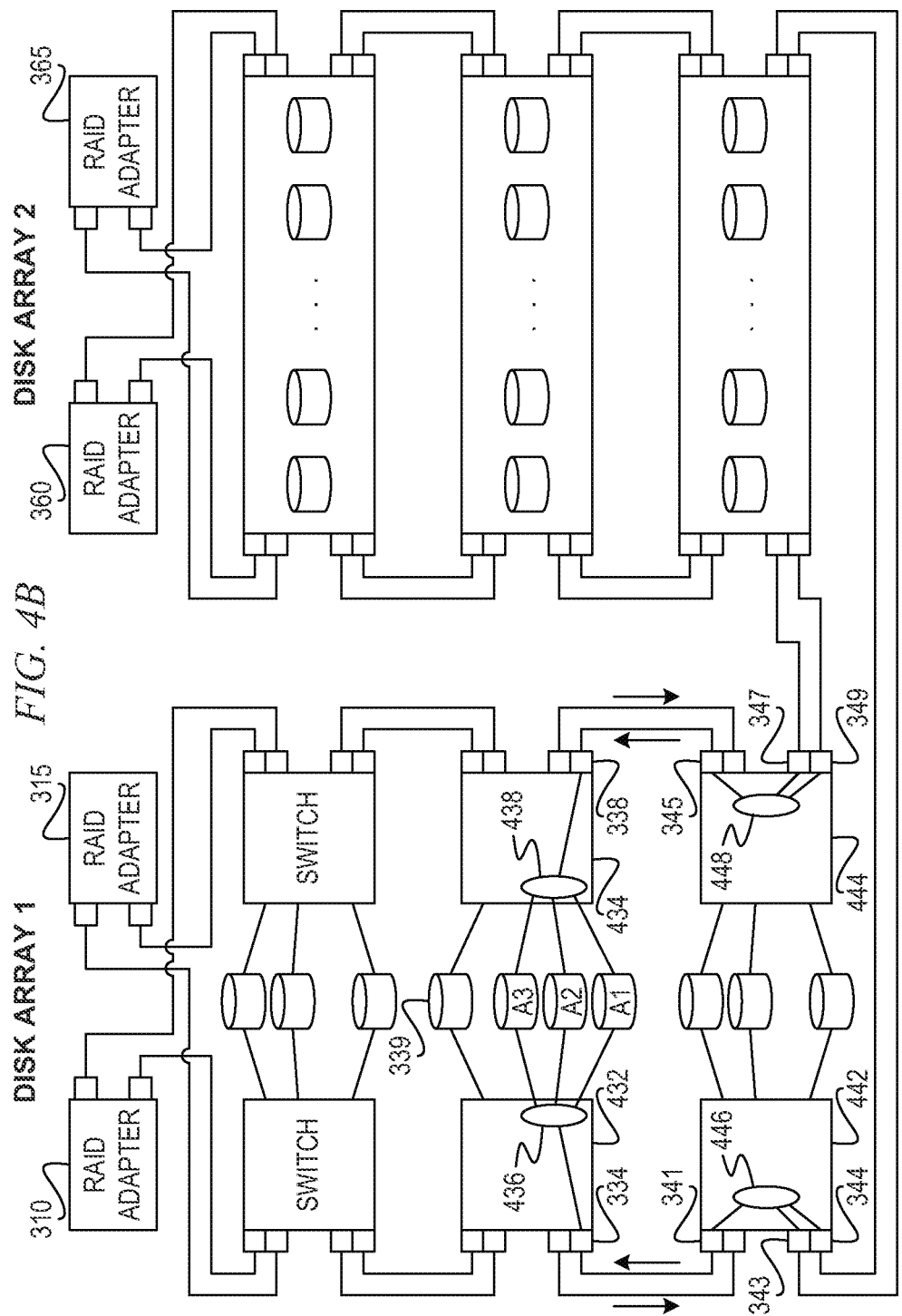

FIGS. 4A and 4B are block diagrams depicting a configuration for concurrently moving storage devices from one adapter pair to another in accordance with an illustrative embodiment. With reference to FIG. 4A, storage enclosure 320 comprises switches 422, 424 connected to storage devices 329, storage enclosure 330 comprises switches 432, 434 connected to storage devices 339, and storage enclosure 340 comprises switches 442, 444 connected to storage devices 349. The mechanism of the illustrative embodiment reconfigures ports 343, 344, 347, 348 to be upstream ports, reconfigures port 334 of switch 432 to be an upstream port, and reconfigures port 341 of switch 442 to be a downstream port.

The mechanism of the illustrative embodiment zones switch 442 with zone 446 to connect port 341 to ports 343, 344 and zones switch 432 with zone 436 that connects port 334 to a port of storage devices A1-A3, which are to be logically moved from disk array 1 to disk array 2. At this point, RAID adapters 310, 315 of disk array 1 still control access to storage devices A1-A3; however, RAID adapters 360, 365 have a path to discover storage devices A1-A3. Once RAID adapters 360-365 complete discovery of one port of storage devices A1-A3, the mechanism transitions read access for these devices from disk array 1 to disk array 2 at the subsystem level. That is, the host, such as servers 104, 106 in FIG. 1, directs all reads of storage devices A1-A3 through RAID adapters 360, 365. The host posts writes at a higher subsystem write cache, above the RAID adapters, until all write operations through RAID adapters 310, 315 are completed. The mechanism then permits writes to storage devices A1-A3 to de-stage through RAID adapters 360, 365.

Turning to FIG. 4B, once write activity is permitted for RAID adapters 360, 365, the mechanism of the illustrative embodiment reconfigures port 338 of switch 434 to be an upstream port, and reconfigures port 345 of switch 444 to be a downstream port. The mechanism of the illustrative embodiment zones switch 444 with zone 448 to connect port 345 to ports 347, 349 and zones switch 434 with zone 438 that connects port 338 to a port of storage devices A1-A3.

At this point, the configuration allows complete redundant access to storage devices A1-A3, and RAID adapters 360, 365 of disk array 2 has full control of the devices. With the exception of the devices being logically moved from one array to the other, all devices maintain full redundant access status throughout. Storage devices A1-A3, having been moved, are also fully available through at least one path throughout operation of the mechanism of the illustrative embodiment.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIG. 5 is a flowchart illustrating operation of a mechanism for moving control of storage devices from one adapter pair to another in accordance with an illustrative embodiment. Operation begins, and the mechanism connects downstream ports at the bottom of two trunked disk arrays together (block 502). The mechanism redefines select downstream and upstream ports to provide a path from adapters from the second array to the storage devices to be moved (block 504). The mechanism zones switches in the first array to allow the second array adapters to discover one port of the array group that is to be moved (block 506).

Then, the mechanism transitions read access for the array group that is to be logically moved from the first array adapters to the second array adapters at a subsystem level (block 508). The mechanism posts writes from the first array adapters at a higher level subsystem write cache until all write operations from the first array adapters to the storage devices to be moved are complete (block 510). The mechanism then permits writes to de-stage through the second array adapters (block 512).

The mechanism redefines select downstream and upstream ports to provide a path from the second array to the storage devices to be moved (block 514). The mechanism zones switches to allow the second array adapters to discover second ports of the array group that is to be logically moved (block 516). Then, the mechanism provides redundant access to the moved storage devices (block 518). Thereafter, operation ends.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in act, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for moving control of storage devices from one adapter pair to another. In a trunked disk array configuration, moving the storage devices from one disk array to another disk array begins by attaching the downstream ports of the two independent disk arrays together. The mechanism redefines one set of the ports as upstream ports and through switch zoning makes a set of devices available to the second disk array adapters. By controlling zoning access and performing discovery one device port at a time, the mechanism transfers access and ownership of the RAID group from one adapter pair to another.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for logically moving storage devices from one array to another, the method comprising:
   connecting a set of downstream ports of a first array of storage devices to a set of downstream ports of a second array of storage devices, wherein the first array of storage devices has one or more controlling adapters and wherein the second array of storage devices has one or more controlling adapters, wherein the first array of storage devices comprises one or more storage enclosures comprising air of switches each having upstream and downstream ports and an array of storage devices and wherein a given storage enclosure contains the array group of storage devices to be logically moved to the second array of storage devices;
   providing a path from the one more controlling adapters of the second array to an array group of storage devices in the first array that are to be logically moved to the second array of storage devices; and
   transitioning read and write access for the array group of storage devices from the one or more controlling adapters of the first array to the one or more controlling adapters of the second array,
   wherein providing a path from the one or more controlling adapters of the second array to the array group of storage devices further comprises:
   redefining a first downstream port of a first switch of the given storage enclosure to be an upstream port; and
   zoning the first switch of the given storage enclosure to connect the first downstream port to a first port of each storage device within the array group of storage devices.

2. The method of claim 1, wherein providing a path from the one or more controlling adapters of the second array to the array group of storage devices further comprises:
   redefining at least one upstream port of a first switch of at least one other storage enclosure to be a downstream port;
   redefining at least one downstream port of the first switch of the at least one other storage enclosure to be an upstream port; and
   zoning the first switch of the at least one other storage enclosure to connect the at least one upstream port to the at least one downstream port.

3. The method of claim 1, wherein transitioning read and write access for the array group of storage devices from the one or more controlling adapters of the first array to the one or more controlling adapters of the second array comprises:
   transitioning read access for the array group of storage devices from the controlling adapters of the first array to the one or more controlling adapters of the second array;
   posting writes from the one or more controlling adapters of the first array to a higher level subsystem write cache until all writes from the one or more controlling adapters of the first array to the array group of storage devices have completed; and
   permitting writes to the array group of storage devices to de-stage through the one or more controlling adapters of the second array.

4. The method of claim 3, wherein providing a path from the one or more controlling adapters of the second array to the array group of storage devices further comprises:
   redefining a second downstream port of a second switch of the given storage enclosure to be an upstream port; and
   zoning the second switch of the given storage enclosure to connect the second downstream port to a second port of each storage device within the array group of storage devices.

5. The method of claim 4, wherein providing a path from the one or more controlling adapters of the second array to the array group of storage devices further comprises:
   redefining at least one upstream port of a second switch of at least one other storage enclosure to be a downstream port;
   redefining at least one downstream port of the second switch of the at least one other storage enclosure to be an upstream port; and
   zoning the second switch of the at least one other storage enclosure to connect the at least one upstream port to the at least one downstream port.

6. The method of claim 4, wherein transitioning read and write access for the array group of storage devices from the one or more controlling adapters of the first array to the one or more controlling adapters of the second array further comprises:
   providing redundant access to the array group of storage devices.

7. A computer program product comprising a non-transitory computer readable storage medium having a computer readable program stored therein, wherein the computer readable program, when executed on a computing device, causes the computing device to:
   provide a path from one or more controlling adapters of a second array to an array group of storage devices in a first array that are to be logically moved to the second array of storage devices, wherein a set of downstream ports of the first array of storage devices is connected to a set of downstream ports of the second array of storage devices, wherein providing the path from the one or more controlling adapters of the second array to the array group of storage devices comprises redefining the set of downstream ports of the first array of storage devices to be upstream ports; and
   transition read and write access for the array group of storage devices from one or more controlling adapters of the first array to the one or more controlling adapters of the second array.

8. A computer program product comprising a non-transitory computer readable storage medium having a computer readable program stored therein, wherein the computer readable program, when executed on a computing device, causes the computing device to:
   provide a path from one or more controlling adapters of a second array to an array group of storage devices in a first array that are to be logically moved to the second array of storage devices, wherein a set of downstream ports of the first array of storage devices is connected to a set of downstream ports of the second array of storage devices, wherein the first array of storage devices comprises one or more storage enclosures comprising a pair of switches each having upstream and downstream ports and an array of storage devices and wherein a given storage enclosure contains the array group of storage devices to be logically moved to the second array of storage devices; and transition read and write access for the array group of storage devices from one or more controlling adapters of the first array to the one or more controlling adapters of the second array, wherein providing a path from the one or more controlling adapters of the second array to the array group of storage devices further comprises:

redefining a first downstream port of a first switch of the given storage enclosure to be an upstream port; and zoning the first switch of the given storage enclosure to connect the first downstream port to a first port of each storage device within the array group of storage devices.

9. The computer program product of claim 8, wherein transitioning read and write access for the array group of storage devices from the one or more controlling adapters of the first array to the one or more controlling adapters of the second array comprises:

transitioning read access for the array group of storage devices from the controlling adapters of the first array to the one or more controlling adapters of the second array;

posting writes from the one or more controlling adapters of the first array to a higher level subsystem write cache until all writes from the one or more controlling adapters of the first array to the array group of storage devices have completed; and permitting writes to the array group of storage devices to de-stage through the one or more controlling adapters of the second array.

10. The computer program product of claim 9, wherein providing a path from the one or more controlling adapters of the second array to the array group of storage devices further comprises:

redefining a second downstream port of a second switch of the given storage enclosure to be an upstream port; and zoning the second switch of the given storage enclosure to connect the second downstream port to a second port of each storage device within the array group of storage devices.

11. The computer program product of claim 8, wherein providing a path from the one or more controlling adapters of the second array to the array group of storage devices further comprises:

redefining at least one upstream port of a first switch of at least one other storage enclosure to be a downstream port;

redefining at least one downstream port of the first switch of the at least one other storage enclosure to be an upstream port; and zoning the first switch of the at least one other storage enclosure to connect the at least one upstream port to the at least one downstream port.

12. The computer program product of claim 10, wherein providing a path from the one or more controlling adapters of the second array to the array group of storage devices further comprises:

redefining at least one upstream port of a second switch of at least one other storage enclosure to be a downstream port;

redefining at least one downstream port of the second switch of the at least one other storage enclosure to be an upstream port; and zoning the second switch of the at least one other storage enclosure to connect the at least one upstream port to the at least one downstream port.

13. The computer program product of claim 10, wherein transitioning read and write access for the array group of storage devices from the one or more controlling adapters of the first array to the one or more controlling adapters of the second array further comprises:

providing redundant access to the array group of storage devices.

14. An apparatus, comprising:

a processor; and a memory coupled to the processor, wherein the memory comprises instructions which, when executed by the processor, cause the processor to:

provide a path from one or more controlling adapters of a second array to an array group of storage devices in a first array that are to be logically moved to the second array of storage devices, wherein a set of downstream ports of the first array of storage devices is connected to a set of downstream ports of the second array of storage devices, wherein providing the path from the one or more controlling adapters of the second array to the array group of storage devices comprises redefining the set of downstream ports of the first array of storage devices to be upstream ports; and transition read and write access for the array group of storage devices from one or more controlling adapters of the first array to the one or more controlling adapters of the second array.

15. An apparatus comprising:

a processor and a memory coupled to the processor, wherein the memory comprises instructions which, when executed by the processor, cause the processor to:

provide a path from one or more controlling adapters of a second array to an array group of storage devices in a first array that are to be logically moved to the second array of storage devices, wherein a set of downstream ports of the first array of storage devices is connected to a set of downstream ports of the second array of storage devices, wherein the first array of storage devices comprises one or more storage enclosures comprising a pair of switches each having upstream and downstream ports and an array of storage devices and wherein a given storage enclosure contains the array group of storage devices to be logically moved to the second array of storage devices; and transition read and write access for the array group of storage devices from one or more controlling adaptors of the first array to the one or more controlling adapters of the second array, wherein providing a path from the one or more controlling adapters of the second array to the array group of storage devices further comprises:

redefining a first downstream port of a first switch of the given storage enclosure to be an upstream port; and zoning the first switch of the given storage enclosure to connect the first downstream port to a first port of each storage device within the array group of storage devices.

16. The apparatus of claim 15, wherein providing a path from the one or more controlling adapters of the second array to the array group of storage devices further comprises:

redefining at least one upstream port of a first switch of at least one other storage enclosure to be a downstream port;

redefining at least one downstream port of the first switch of the at least one other storage enclosure to be an upstream port; and zoning the first switch of the at least one other storage enclosure to connect the at least one upstream port to the at least one downstream port.

17. The apparatus of claim 15, wherein transitioning read and write access for the array group of storage devices from the one or more controlling adapters of the first array to the one or more controlling adapters of the second array comprises:
- transitioning read access for the array group of storage devices from the controlling adapters of the first array to the one or more controlling adapters of the second array;
- posting writes from the one or more controlling adapters of the first array to a higher level subsystem write cache until all writes from the one or more controlling adapters of the first array to the array group of storage devices have completed; and
- permitting writes to the array group of storage devices to de-stage through the one or more controlling adapters of the second array.

18. The apparatus of claim 17, wherein providing a path from the one or more controlling adapters of the second array to the array group of storage devices further comprises redefining a second downstream port of a second switch of the given storage enclosure to be an upstream port and zoning the second switch of the given storage enclosure to connect the second downstream port to a second port of each storage device within the array group of storage devices;

wherein providing a path from the one or more controlling adapters of the second array to the array group of storage devices further comprises redefining at least one upstream port of a second switch of at least one other storage enclosure to be a downstream port, redefining at least one downstream port of the second switch of the at least one other storage enclosure to be an upstream port, and zoning the second switch of the at least one other storage enclosure to connect the at least one upstream port to the at least one downstream port.

19. The apparatus of claim 17, wherein providing a path from the one or more controlling adapters of the second array to the array group of storage devices further comprises redefining a second downstream port of a second switch of the given storage enclosure to be an upstream port and zoning the second switch of the given storage enclosure to connect the second downstream port to a second port of each storage device within the array group of storage devices;

wherein transitioning read and write access for the array group of storage devices from the one or more controlling adapters of the first array to the one or more controlling adapters of the second array further comprises providing redundant access to the array group of storage devices.

* * * * *